US012669112B2

(12) United States Patent

Tüshaus et al.

(10) Patent No.: US 12,669,112 B2

(45) Date of Patent: Jun. 30, 2026

(54) SHAFT-HUB CONNECTION FOR A TRANSMISSION

(71) Applicant: Flender GmbH, Bocholt (DE)

(72) Inventors: Tino Tüshaus, Bocholt (DE); Norbert Haake, Bocholt (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 19/119,673

(22) PCT Filed: Oct. 9, 2023

(86) PCT No.: PCT/EP2023/077873

§ 371 (c)(1),
(2) Date: Apr. 9, 2025

(87) PCT Pub. No.: WO2024/083549

PCT Pub. Date: Apr. 25, 2024

(65) Prior Publication Data

US 2026/0002521 A1 Jan. 1, 2026

(30) Foreign Application Priority Data

Oct. 21, 2022 (EP) .................................... 22202892

(51) Int. Cl.
F03D 80/70 (2016.01)
F16H 57/00 (2012.01)
F16H 57/04 (2010.01)

(52) U.S. Cl.
CPC ....... F03D 80/707 (2023.08); F16H 57/0025 (2013.01); F16H 57/0426 (2013.01);
(Continued)

(58) Field of Classification Search
CPC ............. F16H 57/0025; F16H 57/0426; F16H 57/043; F16H 57/0482; F16H 57/08;
(Continued)

(56) References Cited

U.S. PATENT DOCUMENTS 5,910,063 A * 6/1999 Kato ................... F16H 57/0479
475/159
10,436,249 B2 10/2019 Hoelzl
(Continued)

FOREIGN PATENT DOCUMENTS

CN 205446657 8/2016
CN 206943391 1/2018
(Continued)

OTHER PUBLICATIONS

English translation of CN113175520A; https://translationportal.epo.org; Oct. 28, 2025 (Year: 2025).*
(Continued)

*Primary Examiner* — Roger L Pang

(74) *Attorney, Agent, or Firm* — Henry M. Feiereisen LLC

(57) ABSTRACT

A shaft-hub connection for a planetary transmission includes a shaft, a hub element surrounding an outer circumference of the shaft and drivingly connected to the shaft for rotation about a main rotation axis via splines, a housing element fixed with respect to the main rotation axis, and an oil channel extending in the housing element and the hub element and designed to open out in a region of the splines to supply at least the splines with lubricating oil for oiling. The oil channel forms between the housing element and the hub element a lubrication gap for transferring lubricating oil and extends radially from inside outwards in a region of the lubrication gap.

15 Claims, 7 Drawing Sheets

(52) U.S. Cl.
CPC ....... *F16H 57/043* (2013.01); *F16H 57/0482*
(2013.01); *F05B 2260/40311* (2013.01); *F05B*
*2260/98* (2013.01)

(58) Field of Classification Search
CPC .. F16H 57/0424; F03D 80/707; F03D 15/101;
F03D 80/705; F05B 2260/740311; F05B
2260/98
USPC .............................. 475/159, 160; 184/4, 6.12
See application file for complete search history.

(56) References Cited

U.S. PATENT DOCUMENTS

| | | | |
|---|---|---|---|
| 2005/0209039 A1* | 9/2005 | Kempf | F16C 17/04 |
| | | | 475/159 |
| 2016/0223073 A1 | 8/2016 | Deitmers et al. | |
| 2021/0095755 A1* | 4/2021 | Haake | F16H 57/0423 |
| 2022/0010875 A1* | 1/2022 | De Laet | F16H 57/046 |

FOREIGN PATENT DOCUMENTS

| | | |
|---|---|---|
| CN | 206943391 U | 1/2018 |
| CN | 113175520 | 7/2021 |
| CN | 113175520 A | 7/2021 |
| WO | WO 2017/032558 | 3/2017 |
| WO | WO 2017032558 A1 | 3/2017 |

OTHER PUBLICATIONS

International Search Report issued by the European Patent Office on Jan. 15, 2024 in International Application PCT/EP2023/077873.
CN 113175520 A (Dongfeng Commercial Vehicles Co Ltd) Jul. 27, 2021 (Jul. 27, 2021) figures 1-7 paragraphs [0026]-[0041].
WO 2017032558 A1 (Zahnradfabrik Friedrichshafen [DE]) Mar. 2, 2017 (Mar. 2, 2017) figures 1-2 col. 4, line 29-col. 6, line 14.
US 2016223073 A1 (Deitmers Michael [DE] et al) Aug. 4, 2016 (Aug. 4, 2016) figures 1-3 paragraphs [0029]-[0039].
U.S. Pat. No. 10,436,249 B2 (Miba Gleitlager Austria GMBH [AT]) Oct. 8, 2019 (Oct. 8, 2019) figure 1.
CN 206943391 U (Dongfeng Commercial Vehicle Co Ltd) Jan. 30, 2018 (Jan. 30, 2018) Figures 1-2 pp. 18-19.

* cited by examiner

Planetary Transmission 2

Shaft-Hub Connection 10

Transmission Element 3

Planetary Stage 4

Planetary Stage 6

Spur-Gear Stage 8

SHAFT-HUB CONNECTION FOR A TRANSMISSION

CROSS-REFERENCES TO RELATED APPLICATIONS

This application is the U.S. National Stage of International Application No. PCT/EP2023/077873, filed Oct. 9, 2023, which designated the United States and has been published as International Publication No. WO 2024/083549 A1 and which claims the priority of European Patent Application, Serial No. 22202892.0, filed Oct. 21, 2022, pursuant to 35 U.S.C. 119(a)-(d).

BACKGROUND OF THE INVENTION

The invention relates to a shaft-hub connection for a planetary transmission, comprising a shaft, a hub element drivingly connected to the shaft about a main rotation axis $A_R$ via splines and surrounding the outer circumference of the shaft, wherein a housing element fixed with respect to the main rotation axis is provided, and, extending in the housing element and the hub element, is an oil channel which opens out in the region of the splines, in order to supply at least the splines with lubricating oil for oiling via the oil channel.

Planetary transmissions, provided for example as wind turbine transmissions, can comprise splines between two structural parts rotating with each other. Sufficient supply of lubricant to such metal-to-metal contacts is important to reduce wear. The only indirect accessibility to the lubrication points and the centrifugal effect caused by the rotation of the structural parts make it difficult to supply sufficient lubricant by means of an oil injection or oil spray device. Previous solutions, for example, provided for injecting an oil jet into a gap in the gear coupling between shaft and hub element. In the design of a wind turbine transmission, the shaft element is usually a sun wheel shaft, which transmits a power flow to a hollow hub element of a spur-gear stage. The spur-gear stage is arranged at the generator side in the wind turbine transmission and is thus arranged at the output side in relation to the planetary transmission. The document CN 205446657 U discloses a planetary transmission in which lubricating oil is supplied at the output side via a housing element. The lubricating oil is introduced into the rotating hub element via the housing element. WO 2017/032558 A1 discloses a planetary stage and a subsequent spur-gear stage. Starting from the radially outer housing, an oil channel is routed radially inwards to the splines between the planetary stage and the spur-gear stage. US 2016/223073 A1 discloses an oil transfer from the generator-side support flange of the last planetary stage radially inwards into the hollow shaft, in which the oil is directed to the splines. There is a constant need to further improve the supply of oil to the splines.

The object of the invention is to indicate measures that allow an improved supply of oil to the splines.

SUMMARY OF THE INVENTION

The object is achieved by a shaft-hub connection as set forth hereinafter. Preferred refinements are specified in the dependent claims and the description below and can each represent an aspect of the invention individually or in combination. If a feature is presented in combination with another feature, this serves only for simplified presentation of the invention and is in no way intended to mean that this feature cannot also be a refinement of the invention without the other feature.

One embodiment relates to a shaft-hub connection for a planetary transmission, comprising a shaft, a hub element drivingly connected to the shaft about a main rotation axis AR via splines and surrounding the outer circumference of the shaft, wherein a housing element fixed with respect to the main rotation axis is provided, and, extending in the housing element and the hub element, is an oil channel which opens out in the region of the splines, in order to supply at least the splines with lubricating oil for oiling via the oil channel, wherein the oil channel between the housing element and the hub element forms a lubrication gap for transferring lubricating oil and runs radially from the inside outwards in the region of the lubrication gap.

In the present case, the main rotation axis $A_R$ defines the axial direction, so that the respective radial directions result from this axial direction. The hub element can be designed as a hollow shaft, depending on the underlying configuration. The splines, which connect the shaft and the hub element to each other in a form-fitting manner in order to transfer a torque, can be referred to as short teeth. The short teeth can be obliquely toothed. The hub element and the shaft can be mounted via bearing arrangements, for example in relation to a transmission housing structure comprising the housing element, wherein one of the bearings is designed to absorb or support axial forces. The shaft can centrally accommodate a pitch tube through which electrical lines are routed.

The housing element can be a cover of a transmission housing. The cover can be fitted onto the transmission housing and screwed into place. A main oil supply can be provided in the housing element, with the oil channel branching off from this oil supply. The lubrication gap provides a seal between the stationary housing element and the hub element, which rotates during operation. The lubrication gap serves to transfer oil from a stationary component to a rotating component. The lubrication gap therefore has the function of transferring oil from a stationary and a rotating component. A transmission housing is preferably provided in which the shaft-hub connection is received, and the housing element is designed as an end-side housing cover of the transmission housing. In particular, the arrangement can be such that the housing element sits radially inside the hub element or that the housing element is pushed radially inside the hub element.

It can be provided that a coating of sliding material is applied to an inner circumferential surface of the housing element or to an outer circumferential surface of the hub element. The sliding coating is especially provided to protect against damage caused by abutment of the components.

In an alternative embodiment, a bushing can be arranged between the housing element and the hub element, and the lubrication gap can be formed between the bushing and the hub element. The bushing is preferably made of a copper-tin alloy.

In a preferred embodiment of the shaft-hub connection, at least one radial bore leads circumferentially to at least one circumferentially extending oil groove at the lubrication gap. Preferably, a plurality of radial bores are provided. The radial bores can be arranged uniformly over the circumference. The bores can be circular or oval. The bores can also be slit-shaped in the circumferential direction. Here, for example, three or four slits can be provided over the circumference.

In a preferred refinement of the shaft-hub connection, provision is made that, when the additional bushing is used, it is held on the housing element for conjoint rotation. In particular, it is preferred that a defined radial distance between the housing element or the optional bushing and the hub element exists or is set, so that a lubrication gap is here established between the housing element or the optional bushing and the rotating hub element.

In a particularly preferred embodiment, provision is made that the bushing forms a circumferentially extending oil groove on an inner circumferential surface and/or on an outer circumferential surface. In this case, it appears appropriate if the radial through-holes lie in an axial plane with the at least one oil groove. This means that the through-holes extend from a bottom of the oil groove. In the variant of the outer circumferential and inner circumferential oil groove, these preferably lie in an axial plane of the bushing.

In an alternative embodiment of the shaft-hub connection, provision can be made that an inner circumferential surface of the hub element forms a circumferentially extending oil groove, and the oil groove lies in an axial plane with the radial through-holes of the bushing.

In order to regulate the amount of oil that is diverted from the main oil supply into the oil channel, the oil channel can be routed in the housing element through an aperture bore. Optionally, the aperture bore can also be introduced behind the lubrication gap in the oil channel inside the hub part.

In a first variant of the oil channel, provision can be made that it opens out in the hub element via an axial course in the region of the splines. In a second variant of the oil channel, provision can be made that it opens out in the hub element via a radial course in the region of the splines.

Moreover, the shaft-hub connection is preferably designed such that the shaft and the hub element bear on each other via a pair of axial contact surfaces. Preferably, the oil channel opens out in an axial region between the splines and the pair of axial contact surfaces. It is thus advantageously possible to lubricate both the splines and the pair of axial contact surfaces during operation via the oil channel and to reduce wear. The two axial contact surfaces can have lubrication grooves in order to improve the lubrication of the contact surfaces of the two parts. Alternatively or in combination, the lubrication of the contact surfaces could also be achieved by a crowning in one of the two contact surfaces, or also in both surfaces.

The object is also achieved by a transmission for a wind turbine, consisting of at least one planetary stage and of a hub element drivingly connected to the at least one planetary stage, wherein at least one drive connection between a plurality of planetary stages and/or between the at least one planetary stage and the hub element is designed as a shaft-hub connection as described above. In particular, it can be provided that the subsequent planetary stage rotates more rapidly in relation to the preceding planetary stage.

The object is also achieved by a drive train for a wind turbine, comprising a rotor shaft, which is torque-transmittingly connected to a transmission, and a generator, which is torque-transmittingly connected to the transmission, wherein the transmission is designed as described above. In addition, the planetary transmission and the generator can also be integrated one inside the other, that is to say designed as a generator transmission.

Likewise, the object is achieved by a wind turbine comprising a nacelle on which is rotatably arranged a multiblade rotor that is torque-transmittingly connected to a drive train, wherein the drive train is designed as described above.

The object is further achieved by a data agglomerate comprising data packets combined in a common file or distributed among different files for depicting the three-dimensional design and/or the interactions of all the constituent parts provided in a shaft-hub connection as described above, wherein the data packets are prepared, during processing by a data processing device, to carry out additive manufacturing of the constituent parts of the shaft-hub connection, in particular by 3D printing using a 3D printer, and/or simulation of the functioning of the shaft-hub connection. This enables cost-effective production of prototypes and/or computer-based simulations to study the functioning of the shaft-hub connection, to identify problems in the specific application and to find improvements.

BRIEF DESCRIPTION OF THE DRAWING

The invention is explained below by way of example with reference to the accompanying drawings using preferred exemplary embodiments, wherein the features presented below can each represent an aspect of the invention both individually and in combination. It is shown in:

FIGS. 2 to 4: a first, second and third embodiment, with a bushing sitting between housing element and hub element;

DETAILED DESCRIPTION OF PREFERRED EMBODIMENTS

Figure 1:
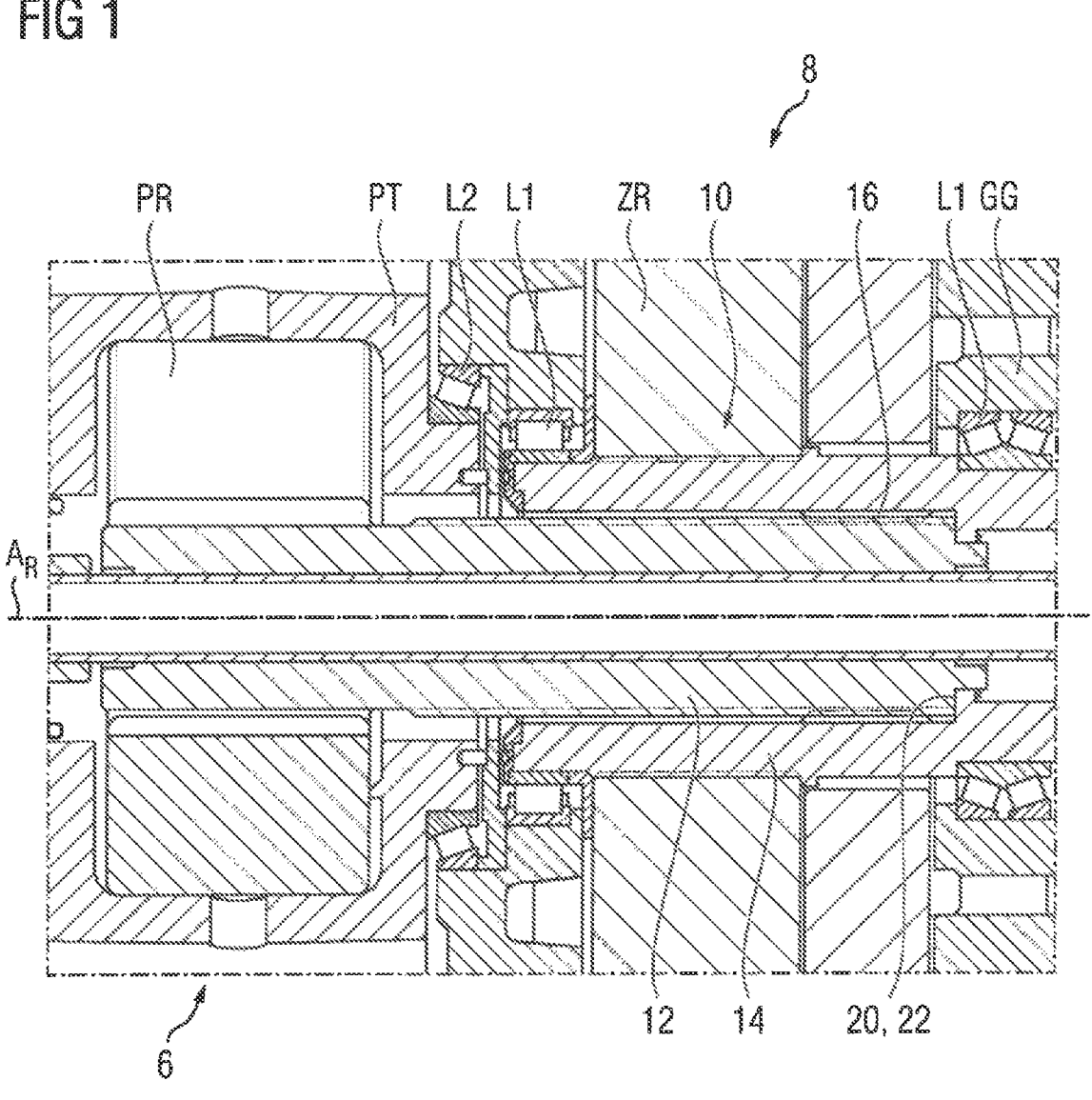
FIG. 1: a structural set-up of a shaft-hub connection.

In FIG. 1, a structural set-up of a possible configuration of a shaft-hub connection 10 is shown, the details of which are described below with reference to the further figures. The shaft-hub connection 10 is provided here as a drive connection between a planetary stage 6 and a spur-gear stage 8. Of the planetary stage 6, only a planetary gear carrier PT and the spline engagement of planetary gears PR with a shaft 12 are shown, the shaft 12 being designed as a sun shaft. Of the spur-gear stage 8, only a hub element 14 and a gearwheel ZR, connected to the latter for conjoint rotation, are shown. The hub element 14 is supported with respect to a transmission housing GG via a bearing arrangement L1. Axial forces introduced into the outer hub element 14 can be supported via the bearing arrangement L1. The shaft 12 is supported on the one hand via splines 16, via which the shaft 12 is drivingly connected to the externally circumferentially arranged hub element 14. On the other hand, the shaft 12 is supported indirectly via a bearing arrangement L2 of the planetary gear carrier PT in the transmission housing GG. A rotation of the shaft 12 and of the hub element 14 can take place about a main rotation axis $A_R$. In an application in which the shaft-hub connection 10 is used, for example, in a planetary transmission for a wind turbine, a non-corotating pitch tube can run within the shaft 12. The hub element 14 is also designed here as a hollow shaft. The shaft 12 and the hub element 14 bear on each other via a combination of axial contact surfaces 20, 22. An axial force that is introduced into the hub element 14 during operation can be supported by way of the axial contact surfaces 20, 22.

Figure 2:
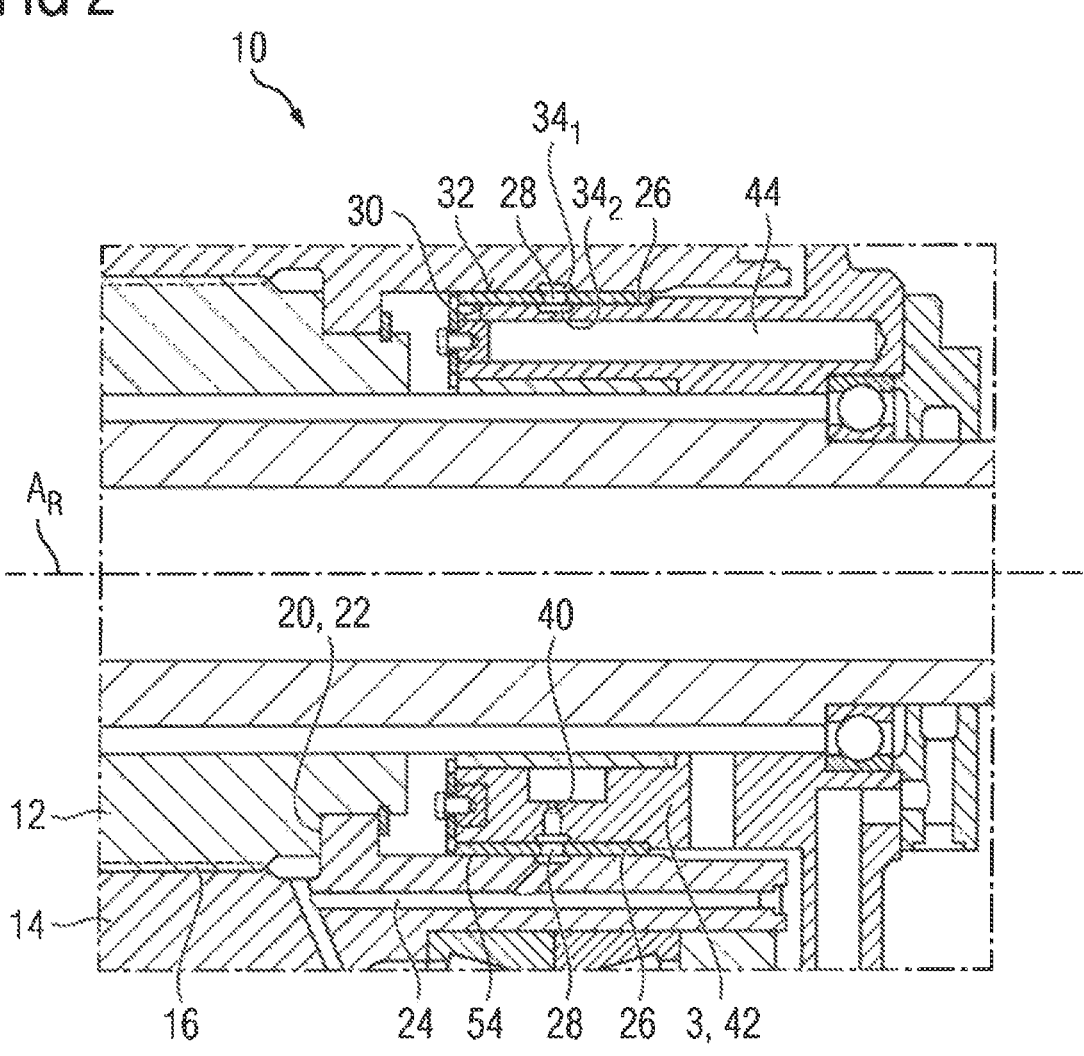

FIG. 2 shows a detail of the end-side region of the unit consisting of planetary transmission 2 and spur-gear stage 8.

This is the region facing a generator unit, although the latter is not shown. The transmission housing 3 here has a housing element designed as housing cover 42. The housing cover 42 can, for example, be screwed onto the rest of the transmission housing 3. In the structure of the housing cover 42, an oil distribution 44 is provided which is connected, for example, to an external oil pump that provides lubricating oil under pressure.

An oil channel 24 is provided, which runs from the oil distribution 44 and opens into the region of the splines 16. It is shown here that the oil channel 24 can open out in an axial region between the splines 16 and the combination of axial contact surfaces 20, 22. By way of the oil channel 24, it is first of all possible to supply lubricating oil to the splines 16 for oiling. The oil channel 24 extends from the rotationally fixed housing cover 42 to the hub element 14, which rotates during operation. A contactless bushing 26 is arranged between the housing cover 42 and the hub element 14 in order to transfer the lubricating oil. The bushing 26 has at least one radial through-hole 28. In the present case, it will be seen that the bushing 26 forms a plurality of radial through-holes 28 about the circumference. The at least one through-hole 28 ensures that the lubricating oil can flow via the bushing 26 from the housing cover 42 into the hub element 14 and that the bushing 26 simultaneously serves as a seal between housing cover 42 and hub element 14, between which a relative rotation prevails during operation. The bushing 26 is held for conjoint rotation in the housing cover 42. A lubrication gap 54 is arranged between the bushing 26 and the hub element 14. In the housing cover 42, an aperture bore 40 is provided in the oil channel 24, which aperture bore can also be designated as a tapering of the cross section and allows the oil flow to be adjusted.

FIG. 2 shows an embodiment in which the bushing 26 forms a circumferential oil groove $34_1$, $34_2$ on an inner circumferential surface 30 and on an outer circumferential surface 32, respectively. Here, the two oil grooves $34_1$, $34_2$ preferably lie in an axial plane. It will also be seen that the oil channel 24 in the hub element 14 opens out in the region of the splines 16 via a radial course.

Figure 3:
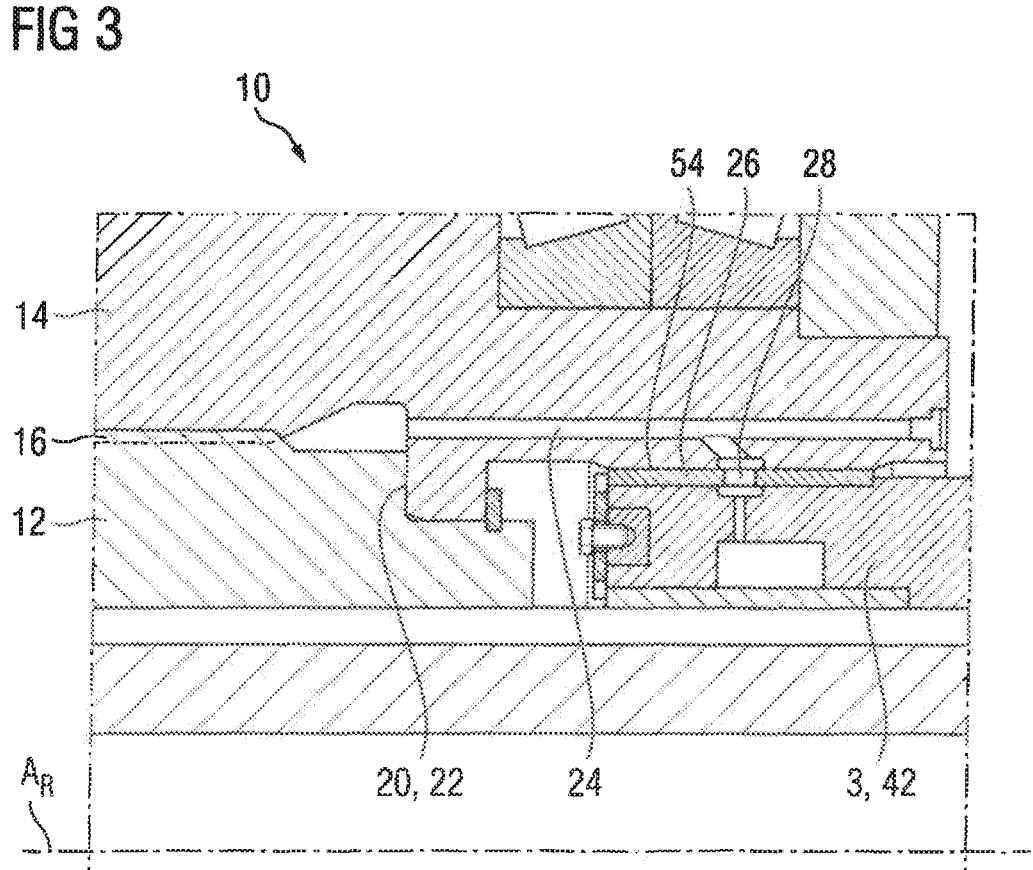

FIG. 3 shows an embodiment in which the oil channel 24 in the hub element 14 opens out in the region of the splines 16 via an axial course. In other respects, the embodiments in FIGS. 2 and 3 correspond.

Figure 4:
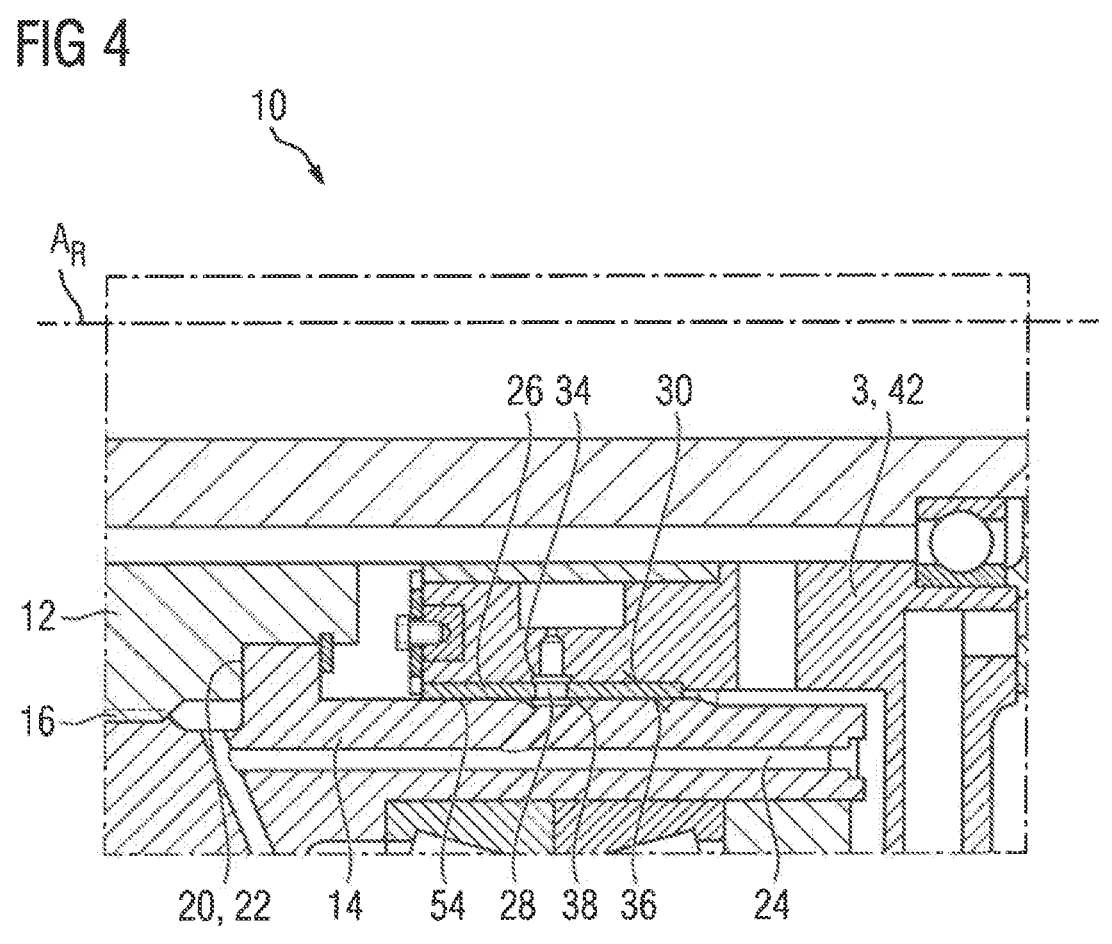

FIG. 4 shows an embodiment in which the bushing 26 forms a circumferentially extending oil groove 34 on an inner circumferential surface 30, and an inner circumferential surface 36 of the hub element 14 forms a circumferentially extending oil groove 38. In addition, the oil groove 38 here can also lie in an axial plane with the at least one radial through-hole 28 of the bushing 26. In other respects, the embodiments in FIGS. 2, 3 and 4 correspond.

Figure 5:
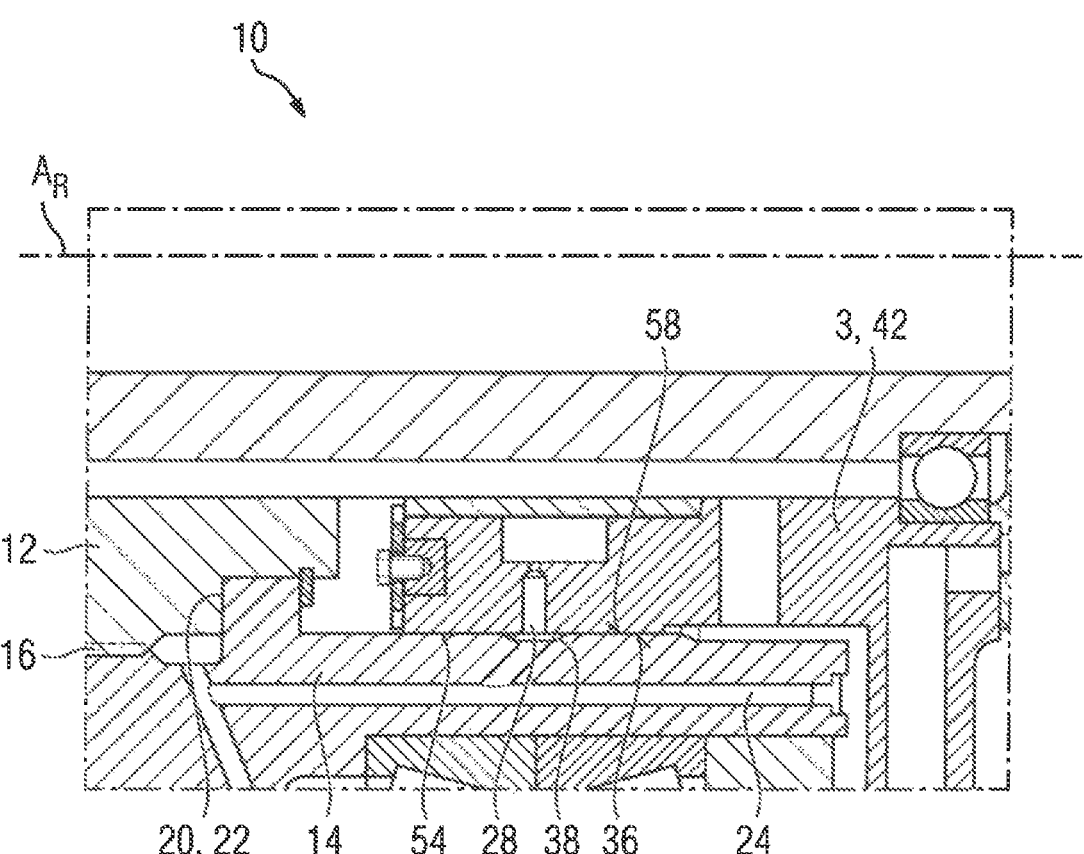
FIG. 5: another embodiment without a bushing between housing element and hub element.

FIG. 5 shows an embodiment without bushing 26. Instead, the lubrication gap 54 for transferring lubricating oil is formed directly between an inner circumferential surface 58 of the housing element 3 and an outer circumferential surface 36 of the hub element 14. In this case, a coating of sliding material can be provided, which is applied either to the inner circumferential surface 58 of the housing element 3 or to the outer circumferential surface 36 of the hub element 14.

Figure 6A:
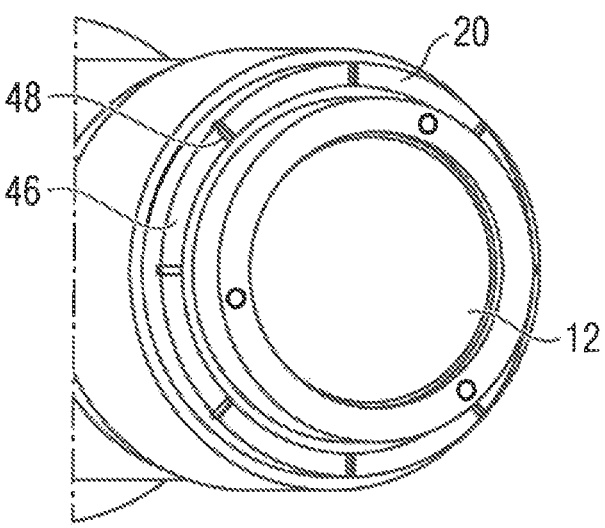
FIGS. 6a) and 6b): views of the hub element and of the shaft.
Figure 6B:
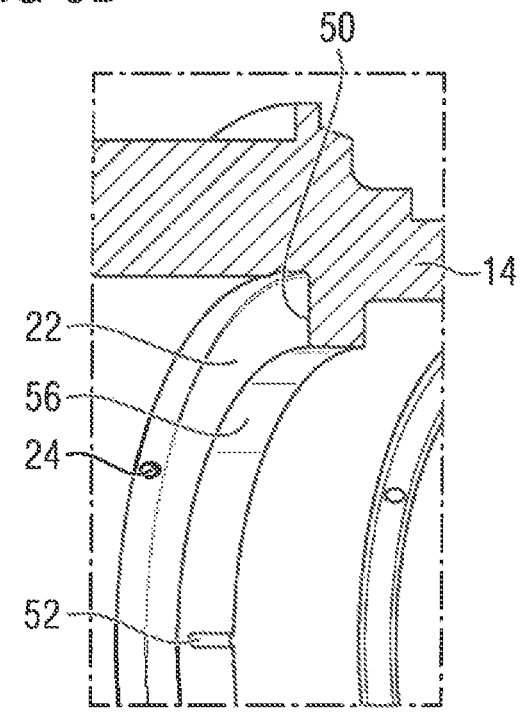

FIG. 6 shows an axial view of the shaft 12—FIG. 6a)—and a perspective sectional view of the hub element 14—FIG. 6b). In FIG. 6a), a contact shoulder 46 can be seen, on which the axial contact surface 20 is arranged. A plurality of radially extending oil grooves 48 are arranged on the axial contact surface 20. The plurality of oil grooves 48 are evenly distributed over the circumference of the axial contact surface 20. Here, eight oil grooves 48 are provided, the number of which may also vary. FIG. 6b) shows a contact shoulder 50 of the hub element 14, wherein the axial contact surface 22 is arranged laterally on the contact shoulder 50. A plurality of axially extending oil grooves 52 are arranged on a cylinder surface 56 of the contact shoulder 50. The plurality of oil grooves 52 are uniformly distributed over the circumference of the cylinder surface 56.

Figure 7:
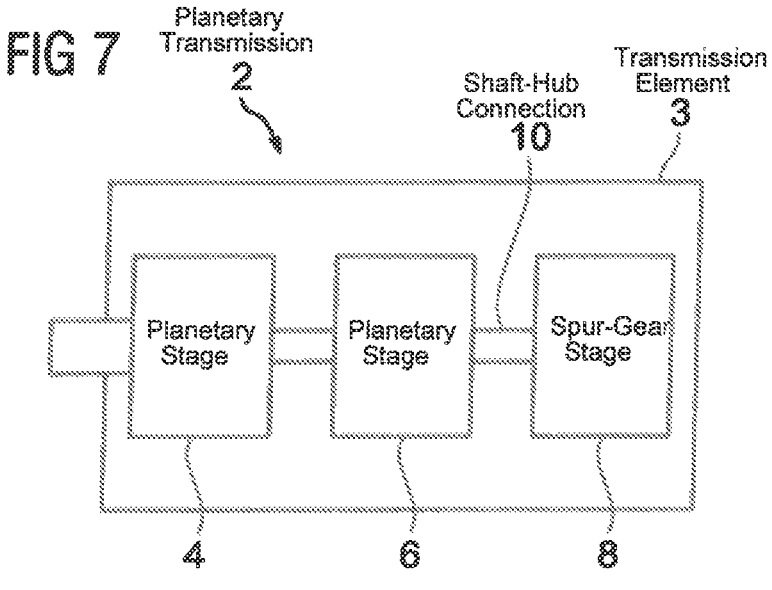
FIG. 7: a planetary transmission in a drive train for a wind turbine.

FIG. 7 shows a purely exemplary planetary transmission 2, for example for a wind turbine. A first and a second rotating planetary stage 4, 6 and a spur-gear stage 8 are mounted in succession in a transmission housing 3. In the present case, a shaft-hub connection 10 is provided as drive connection between the second planetary stage 6 and the spur-gear stage 8. It may be provided that the second planetary stage 6 is designed to rotate more rapidly in relation to the first planetary stage 4.

Figure 8:
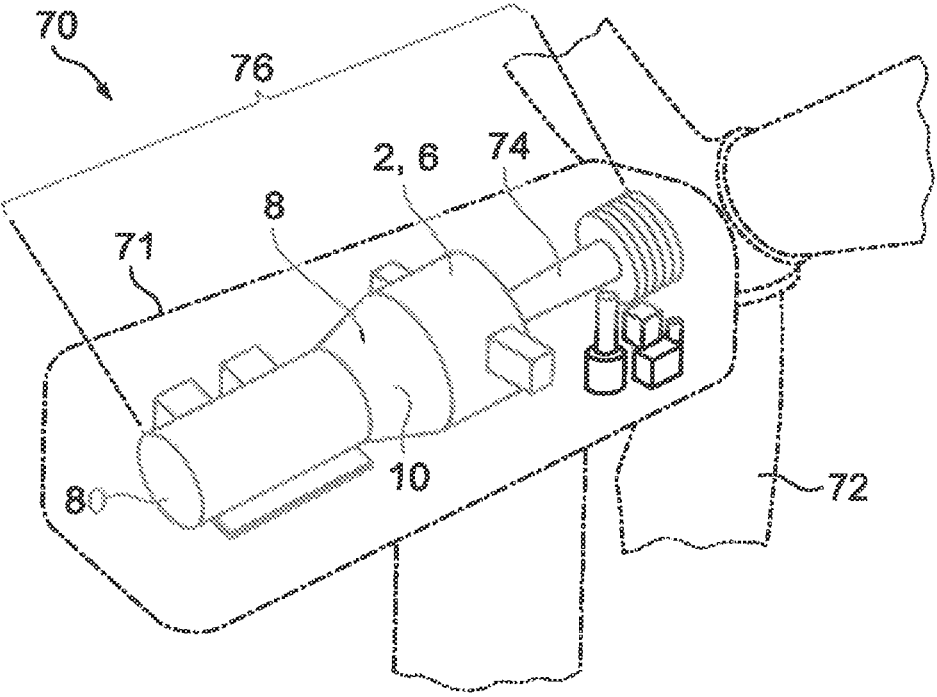
FIG. 8: a perspective view of a wind turbine.

FIG. 8 shows an embodiment of a wind turbine 70. The wind turbine 70 comprises a nacelle 71 on which a multi-blade rotor 72 is rotatably arranged. The multi-blade rotor 72 is torque-transmittingly connected to a main shaft 74, wherein the main shaft 74 belongs to a drive train 76. The drive train 76 further comprises a planetary transmission 2, which is torque-transmittingly connected to the main shaft 74. The planetary transmission 2 has at least one planetary stage 6 and a spur-gear stage 8 and is coupled to a generator 80. In the present case, a shaft-hub connection 10 is provided as drive connection between the planetary stage 6 and the spur-gear stage 8, wherein the shaft-hub connection 10 can be configured as described above.

The invention claimed is:

1. A shaft-hub connection for a planetary transmission, the shaft-hub connection comprising:
  a shaft;
  a hub element surrounding an outer circumference of the shaft and drivingly connected to the shaft for rotation about a main rotation axis via splines;
  a housing element fixed with respect to the main rotation axis;
  an oil channel extending in the housing element and the hub element and designed to open out in a region of the splines to supply at least the splines with lubricating oil for oiling, said oil channel forming between the housing element and the hub element a lubrication gap for transferring lubricating oil and extending radially from inside outwards in a region of the lubrication gap; and
  bearings radially supporting an outer circumference of the hub element which are radially aligned with the lubrication gap.

2. The shaft-hub connection of claim 1, further comprising a transmission housing designed to receive the shaft-hub connection, said housing element being formed as an end-side housing cover of the transmission housing.

3. The shaft-hub connection of claim 1, wherein the housing element sits radially inside the hub element.

4. The shaft-hub connection of claim 1, further comprising a coating of sliding material applied to an inner circumferential surface of the housing element or to an outer circumferential surface of the hub element.

5. The shaft-hub connection of claim 1, further comprising a bushing arranged between the housing element and the hub element, said lubrication gap being formed between the bushing and the hub element.

6. The shaft-hub connection of claim 5, wherein the bushing comprises a radial bore to enable lubricating oil to flow via the bushing from the housing element into the hub element.

7. The shaft-hub connection of claim 5, wherein the bushing is held for conjoint rotation on the housing element.

8. The shaft-hub connection of claim 6, wherein the bushing includes a circumferentially extending oil groove on an inner circumferential surface of the bushing or on an outer circumferential surface of the bushing, said radial bore lying in an axial plane with the oil groove.

9. The shaft-hub connection of claim 6, wherein the hub element has an inner circumferential surface formed with a circumferentially extending oil groove, said oil groove lying in an axial plane with the radial bore of the bushing.

10. The shaft-hub connection of claim 1, wherein the oil channel is routed in the housing element or in the hub element through an aperture bore.

11. The shaft-hub connection of claim 1, wherein the oil channel opens out in the hub element via an axial course in the region of the splines or the oil channel opens out in the hub element via a radial course in the region of the splines.

12. The shaft-hub connection of claim 1, wherein the shaft and the hub element bear against each other via a pair of axial contact surfaces, said oil channel opening out in an axial region between the splines and the pair of axial contact surfaces.

13. A transmission, comprising:
a planetary stage;
a hub element drivingly connected to the planetary stage; and
a drive connection provided between a plurality of planetary stages or between the planetary stage and the hub element and designed as a shaft-hub connection, the shaft-hub connection comprising a shaft having an outer circumference surrounded by the hub element and drivingly connected to the shaft for rotation about a main rotation axis via splines, a housing element fixed with respect to the main rotation axis, and an oil channel extending in the housing element and the hub element and designed to open out in a region of the splines to supply at least the splines with lubricating oil for oiling, said oil channel forming between the housing element and the hub element a lubrication gap for transferring lubricating oil and extending radially from inside outwards in a region of the lubrication gap, and bearings radially supporting an outer circumference of the hub element which are radially aligned with the lubrication gap.

14. A drive train, comprising:
a transmission comprising a planetary stage, a hub element drivingly connected to the planetary stage, and a drive connection provided between a plurality of planetary stages and/or between the planetary stage and the hub element and designed as a shaft-hub connection, the shaft-hub connection comprising a shaft having an outer circumference surrounded by the hub element and drivingly connected to the shaft for rotation about a main rotation axis via splines, a housing element fixed with respect to the main rotation axis, and an oil channel extending in the housing element and the hub element and designed to open out in a region of the splines to supply at least the splines with lubricating oil for oiling, said oil channel forming between the housing element and the hub element a lubrication gap for transferring lubricating oil and extending radially from inside outwards in a region of the lubrication gap;
bearings radially supporting an outer circumference of the hub element which are radially aligned with the lubrication gap;
a main shaft which is torque-transmittingly connected to the transmission; and
a machine which is torque-transmittingly connected to the transmission.

15. A wind turbine, comprising:
a nacelle;
the drive train of claim 14;
a multi-blade rotor arranged on the nacelle for rotation and torque-transmittingly connected to the drive train.

* * * * *